United States Patent [19]

Bachmann et al.

[11] Patent Number: 4,823,836

[45] Date of Patent: Apr. 25, 1989

[54] DAMPERS WITH LEAF SPRING SEALS

[76] Inventors: Lothar Bachmann, Dillingham Hill Rd., R.F.D. #3; William F. Koch, R.F.D. #3 Box 483, both of Auburn, Me. 04210

[21] Appl. No.: 200,504

[22] Filed: May 31, 1988

[51] Int. Cl.[4] .............................................. F16K 25/00
[52] U.S. Cl. ........................................ 137/601; 49/91; 98/121.1; 251/177; 251/180
[58] Field of Search ............... 137/601; 251/176, 180, 251/177, 174; 98/121.1 X; 49/91 X, 92

[56] References Cited

U.S. PATENT DOCUMENTS

| | | | |
|---|---|---|---|
| 3,504,883 | 4/1970 | Beck | 251/172 |
| 3,698,429 | 10/1972 | Lowe et al. | 137/601 |
| 3,832,940 | 9/1974 | Hess | 137/601 X |
| 4,199,898 | 4/1980 | Connor | 137/601 X |
| 4,325,411 | 4/1982 | Squirrel | 137/601 |
| 4,334,550 | 6/1982 | Connor et al. | 137/242 |

Primary Examiner—Stephen Hepperle

[57] ABSTRACT

A leaf spring seal to effect sealing contact between such members as a damper blade and a frame consists of a set of leaf springs having their inner portions held together by clamping components of which one is a bar and the other the inner portion of a ledge. Either the ledge or the bar may be a part of whichever member is to be provided with the seal with the other member then provided with a seat. The outer leaf spring portions of the leaf springs are all inclined in the same direction and to the same extent relative to their inner portions and decrease in width with the outer leaf spring portion of maximum width and in sealing contact with the seat when the seal and seat are in engagement with the leaf spring set then tensioned. The outer portion of the ledge is inclined in the same direction as the outer leaf spring portions and engages one of them to maintain the leaf spring set tensioned at least until the seal and the seat are engaged. Appropriate seal lengths consist of a series of shorter lengths with the leaf springs and clamping components thereof connected to the seal carrying member in a manner enabling thermal expansion forces to be accommodated.

17 Claims, 6 Drawing Sheets

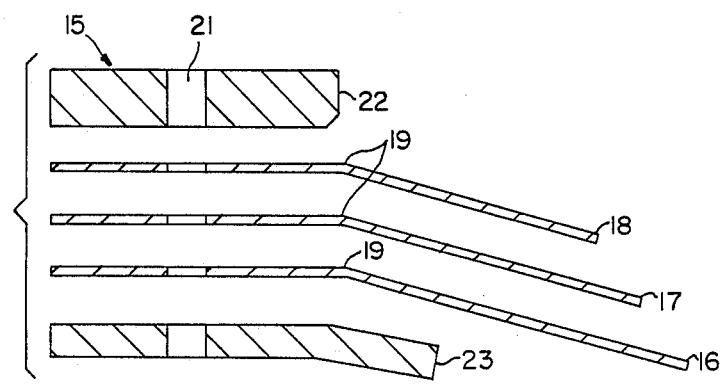
FIG.1
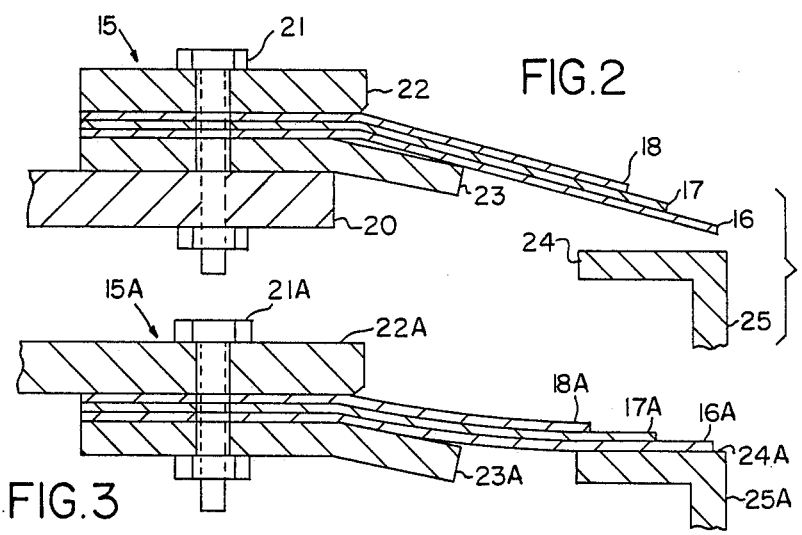
FIG.2
FIG.3
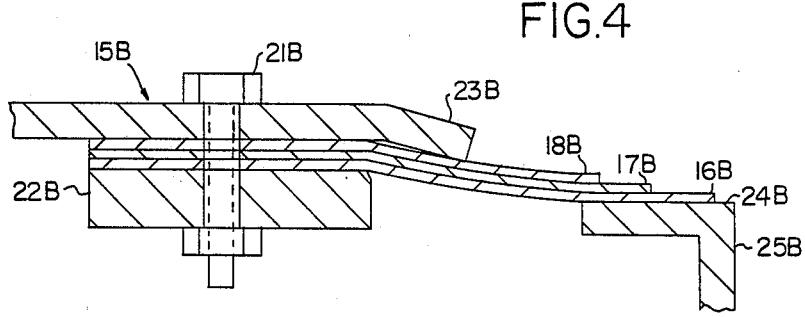
FIG.4

DAMPERS WITH LEAF SPRING SEALS

BACKGROUND OF THE INVENTION

Power plants smelters steel mills, cement plants and paper and pulp plant operations are attended by large volumes of exhaust gases which are variously processed before being discharged.

By way of but two examples of exhaust gas processing, an exhaust gas system may be provided with parallel branches containing environmental pollution abatement equipment such as bag houses, electrostatic precipitators or scrubbers with each branch equipped with dampers enabling it to be isolated and entered when service therein is required As another example, the exhaust system of a gas turbine, kiln, furnace or other incineration process may be provided with a diverter equipped with a damper operable to direct the hot gas through a heat recovery steam boiler or to divert such gas to a bypass system.

The ducts which are to include such dampers vary greatly in size but are typically large with some twenty feet by twenty feet by way of one example. The larger the cross sectional dimensions of a duct, the more difficult it is to provide a seat for a seal which is capable both of effective sealing engagement therewith and of withstanding the rigors of use.

In one type of damper, blades slide across the ports and are marginally sealed in various ways. One such way employs a seal having a pair of cantilever leaf spring sets with the leaf springs of each set successively decreasing in width and with both sets disposed to be flexed as the blade passes between them with the widest leaf springs then seated against the margins of the blade. In one such arrangement, see U.S. Pat. No. 4,088,146, the cantilever leaf spring sets were not flexed until the blade forced them apart while in U.S. Pat. No. 3,504,885, the seals between which the blade passes are held flexed by each other until forced apart by the blade and each is backed by a leaf spring.

Leaf springs, due to their flexibility and resilience are also well adapted for use in dampers having blades which are centrally pivoted, which are connected at one end to a pivot shaft or which are otherwise supported for movement lengthwise of the flow path through a port.

One type of cantilever leaf spring seal for such uses utilizes a bias leaf spring in conjunction therewith. In U.S. Pat. No. 3,698,429, the bias leaf spring holds the cantilever leaf spring tensioned at all times while in U.S. Pat. No. 4,325,411 the cantilever leaf spring is not affected by the bias leaf spring until the port is closed, both springs then becoming tensioned.

THE PRESENT INVENTION

The general objective of the present invention is to provide dampers with seals which insure effective port sealing even when employed in streams of high velocity, high temperatures or both.

In accordance with the invention, this objective is attained with a damper of the type consisting of a member, marginally of and in most instances, surrounding a port, a blade member movable more or less lengthwise of the flow path through the port into and out of an operative position relative to the first named member and a seal. Either one of the members may have a seat with the seal connected to the other member for engagement with or by the seat.

The seal consists of a plurality of leaf springs bent along a lengthwise line to establish inner and outer portions having the same angular relationship. The inner portions are clamped together against the seal carrying member with the outer portions held together as an untensioned, cantilever leaf spring set. The outer leaf spring portions progressively decrease in width and the leaf spring of maximum width is disposed and dimensioned to have a marginal section to engage or be engaged by the seat in the operative position of the movable member, the set becoming then flexed and tensioned with the marginal section of the leaf spring of maximum width in effective sealing contact with the seat and preferably with another leaf spring also overlying the seat.

The seal carrying member also includes a ledge which is inclined in the same direction as the leaf springs and is so disposed and dimensioned as to engage a leaf spring and effect the tensioning of the set to an extent preventing the vibration of the leaf springs which in exhaust streams of a substantial velocity cause metal fatigue, early seal failure and, additionally objectionable noise in one embodiment of the invention, the inclination of the ledge is to a lesser degree than the leaf springs and engages that one of them which is of maximum width to effect the tensioning of the outer portions of the leaf spring set which are flexed against the edge of the ledge when the set is in sealing contact with the seat. In another embodiment, the inclination of the ledge is greater than that of the leaf springs and engages the outer leaf spring portion of minimum width to effect the tensioning of the leaf spring set which is flexed against the outer edge of the ledge when the set is in sealing contact with the seat.

Another objective of the invention is to provide a seal which may be readily assembled on the appropriate one of the members and which will accommodate thermal expansion forces. Each seal consists of one or more sides which, in most uses, have their ends connected to establish corners. The seal and seat may be of a length to extend along a side of a port, rectangular to surround a port or U-shaped as, for example, in the case of a louver damper.

In order that expansion forces exerted on the seals can be accommodated, each seal side consists of separate lengths of clamping bars, leaf spring sets and ledges, unless the clamping bar or the ledge is an integral part of the seal carrying member. Such components, desirably of the same length except as they may be trimmed at the ends of the sides, have slots or oversized holes for the bolts or studs by which they are to be secured to the seal carrying member Corresponding ones of such separate components are connected to the seal carrying member with gaps between adjacent ends and in the installed seal, the gaps between the ends of corresponding leaf springs are offset relative to other gaps of the assembly, the underlying component, unless an integral part of the seal carrying member, may have its ends in alignment with the ends of the overlying component.

In practice, corners are established with the ends of the leaf spring sections of maximum width overlapping and the adjacent ends the other seal components spaced apart to provide gaps and preferably mitered.

Other objectives of the invention and the manner of their attainment will be apparent from the following description of preferred embodiments and the appended claims.

BRIEF DESCRIPTION OF THE DRAWINGS

The accompanying drawings illustrate preferred embodiments of the invention of which—

FIG. 1 is an exploded, cross sectional view of the components of a leaf spring seal in accordance with the invention;

FIG. 2 is a like view of an assembled seal with the leaf spring set tensioned by the ledge;

FIG. 3 is a like view of a leaf spring seal in accordance with another embodiment of the invention in which the clamping bar is an integral part of the seal carrying member and the leaf spring set is shown as tensioned by its engagement with or by the seat;

FIG. 4 is a like view of yet another embodiment of the invention in which the ledge is an integral part of the seal carrying member and is in tensioning engagement with the leaf spring of minimum width and also illustrates the set flexed against the edge of the ledge by the engagement of the seal with or by the seat;

THE PREFERRED EMBODIMENT OF THE INVENTION

Figure 5:
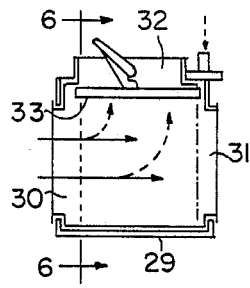
FIG. 5 is a somewhat schematic view, on a much reduced scale, of a diverter for use in exhaust systems.

A seal in accordance with the invention is for use where a blade is movable lengthwise of a fluid stream into and out of an operative position relative to structure such as a frame surrounding a port in which position the seal and a seat coact to provide a sealed area surrounding or partly surrounding the port and preventing fluid flow therethrough. Either the seal or the seat may be carried by the blade or attached to the frame.

Such a seal is generally indicated at 15 in FIGS. 1 and 2 and is shown as having three leaf springs 16, 17, and 18 each of which is bent along a lengthwise line 19 to provide inner and outer portions, all of the same angular relationship, 15° by way of example and not of limitation. The outer portion of the leaf spring 16 is the widest and corresponding portions of the leaf springs 17 and 18 are progressively narrower.

The inner leaf spring portions are clamped together and secured to the seal carrying member 20 to provide an untensioned leaf spring set by connectors 21 which are shown as bolts extending through a clamping bar 22, the inner leaf spring portions and the inner portion of a ledge 23. The holes in the clamping bar 22, the set of leaf springs and the ledge 23 through which the bolts extend are oversized to enable expansion forces to be accommodated and are often in the form of slots extending lengthwise of the seal.

The outer portions of the leaf springs 16, 17, and 18 are so dimensioned that at least the widest and preferably the next widest of them have marginal sections which will overlie the seat 24 of the member 25. When the marginal section of the leaf spring 16 and the seat are in mutual contact, the leaf spring set becomes tensioned. The thickness of the leaf springs is typically in the 0.012 to 0.020 inches range and their flexibility ensures that the leaf spring 16 is seated firmly against the seat 24 and due to its flexibility it conforms to any irregularity thereof. The leaf springs are of an alloy suitable for stressed use under operating conditions within required elastic ranges and also have expansion characteristics compatible with the members by which and to which they are attached.

An important feature of the seal 15 is its ledge 23 which is inclined in the same direction, but to a lesser extent than the outer leaf spring portions, 10° by way of example and not of limitation. The ledge 23 is so disposed and dimensioned that its extremity is engaged by the outer portion of the leaf spring 16 inwardly of its marginal, seat engaging section and holds the leaf spring set sufficiently tensioned to prevent their outer portions from being vibrated by a gas stream of a velocity such that would otherwise result in metal fatigue, early seat failure and also objectionable noise.

The embodiment of the invention illustrated by FIG. 3 is substantially the same as that which has just been described and, accordingly its components will not be described except as they may differ from the components of the embodiment illustrated by FIGS. 1 and 2. Corresponding components are identified by the same reference numerals distinguished by the suffix addition A. In this embodiment, the clamping bar 22A is an integral part of the seal carrying member 20A.

In FIG. 4, the seal consists of the same components shown in the previously described embodiments and these will not again be detailed and are identified by the same reference numerals distinguished by the suffix addition B. One difference from previously discussed embodiments is that the ledge 23B is an integral part of the seal carrying member 20B. Another difference is that the ledge 23B overlies the leaf spring 18B and the angle between its inner and outer portions is more acute than that between the inner and outer portions of the leaf springs and it thus engages the leaf spring 18B and tensions the leaf spring set at all times. When the leaf spring set is in sealing contact with the seat 24B, the leaf springs are flexed against the outer edge of the ledge 23B.

Seals in accordance with the invention re made in straight sides and the ends of such sides are interconnected to provide corners of rectangular and U-shaped seals. Seals and seats in accordance with the invention may extend along a side of a port, surround a port or be U-shaped for use in louver dampers, for example The construction of such sides may employ seals in accordance with any of the embodiments illustrated by FIGS. 1–4 and there must be at least two leaf springs in each seal.

In order that such seal sides may be readily assembled on the seal carrying members and also accommodate thermal expansion forces, each straight side consists of separate and preferably equal lengths of the leaf spring clamping bars and ledges, unless either the clamping bar or the ledge is an integral part of the seal carrying member. Corresponding ones of such separate components are connected to the seal carrying member with gaps between adjacent ends and in the installed seal, the gaps between the ends of corresponding leaf spring lengths are offset relative to other gaps between other corresponding components of the assembly. All such gaps are dimensioned to enable thermal expansion forces to be accommodated. Each seal thus consists of sections which may be identified by the fully exposed seal component. It will be obvious that to establish and maintain the offset gaps, at the ends of each side, the components are trimmed as needed for that purpose.

The ports of exhaust systems vary greatly in size and the larger the cross sectional area of a port, the more difficult it is to provide a seat free of irregularities and a seal which can accommodate any such irregularities particularly when, as with most exhaust systems, thermal expansion forces must also be accommodated.

Diverters such as are incorporated in the exhaust systems of gas turbines are a type of apparatus where the use of seals in accordance with the invention is particularly beneficial because of the sharp temperature rises and large volumes of exhaust gases attendant their use.

Figure 6:
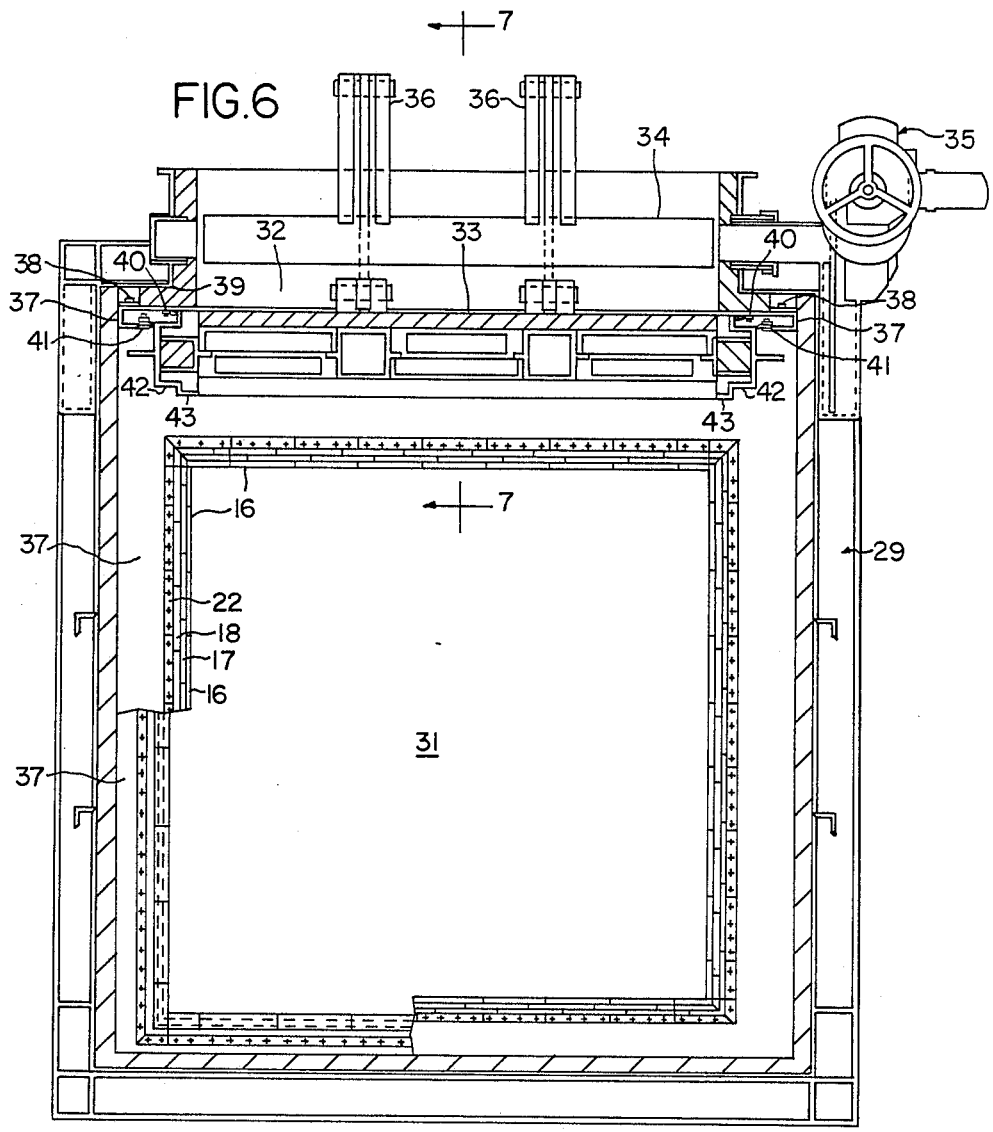
FIG. 6 is a section on a substantial increase in scale taken approximately along the indicated line 6—6 of FIG. 5.
Figure 7:
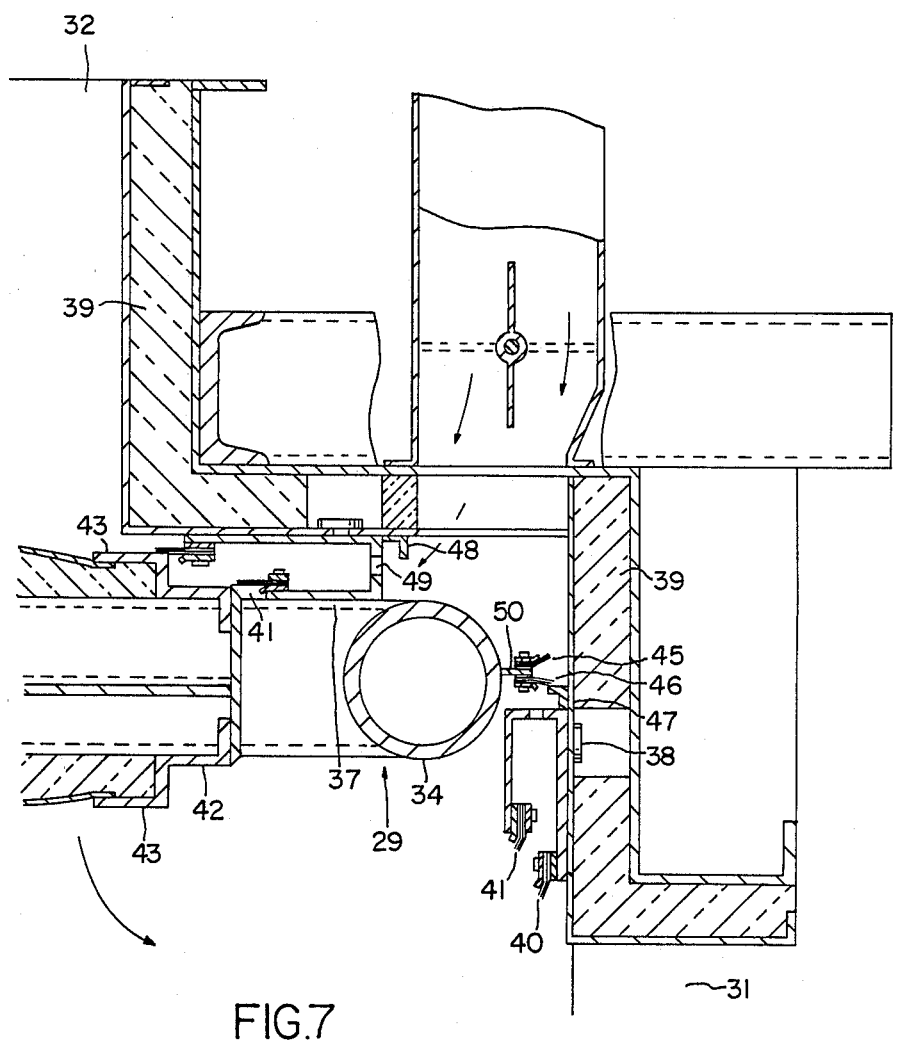
FIG. 7 is a section on a further increase in scale taken approximately along the indicated line 7—7 of FIG. 6.

Such a diverter, see FIGS. 5-7, is generally indicated at 29 and is of the type fully detailed in our copending application Ser. No. 055,594, filed May 29, 1987. The diverter 29 has an inlet port 30 for the hot gas stream, an aligned outlet port 31 to be connected by duct work to a heat recovery steam boiler, for one example, and an outlet port 32 to be connected to a bypass system.

The diverter has a blade 33 having one end fixed on a pivot shaft 34 which is swung by the reversible drive, generally indicated at 35, connected to the blade 33 by toggle joints 36 into and out of an operative position relative to either outlet port.

A U-shaped, square, rectangular frame 37 surrounds each port with its outer wall secured by clips 38 against the insulation 39 and somewhat wider than the inner wall. A primary seal, generally indicated at 40, is secured to the margins of the outer, wider frame wall and a back up seal, generally indicated at 41, is mounted on the margin of the inner wall of the frame. The seals 40 and 41, which differ only as to size, are of the type illustrated by FIGS. 1 and 2 and the same reference numerals are employed to designate seal components. The seals are assembled on the frame walls in the previously described manner. The margins of the blade 33 has seats 42 and 43 at each side so offset as to engage the seals 40 and 41, respectively of whichever outlet port is to be closed and sealed. It will be seen that the corners of the seals 35 and 36 are established by having the ends of the leaf springs 16 overlap to avoid an increase in seal thickness in the corners. The proximate ends of the other seal components are spaced apart to provide gaps and usually are mitered.

Air from a blower, not shown, is discharged through a damper controlled port 44 into the corner of the diverter adjacent the pivot shaft 34. The pivot shaft 34 is provided with lengthwise seals 45 and 46 for engagement, respectively with lengthwise seats 47 and 48 on the turning of the shaft 34 in the appropriate direction and to the appropriate extent. The closed ends of the frames 37 adjacent said corner have ports 49 either one of which is blocked when the adjacent seats 47, 48 are engaged by the appropriate one of the seals 45, 46. When the ports 49 of either adjacent frame 37 are unsealed, blower air is discharged into the space between the seals 40 and 41 surrounding the then closed port. The seals 45 and 46 are shown as of the type illustrated by FIGS. 1 and 2 differing only that each is connected to opposite sides of the seal carrying member 50.

Figure 8:
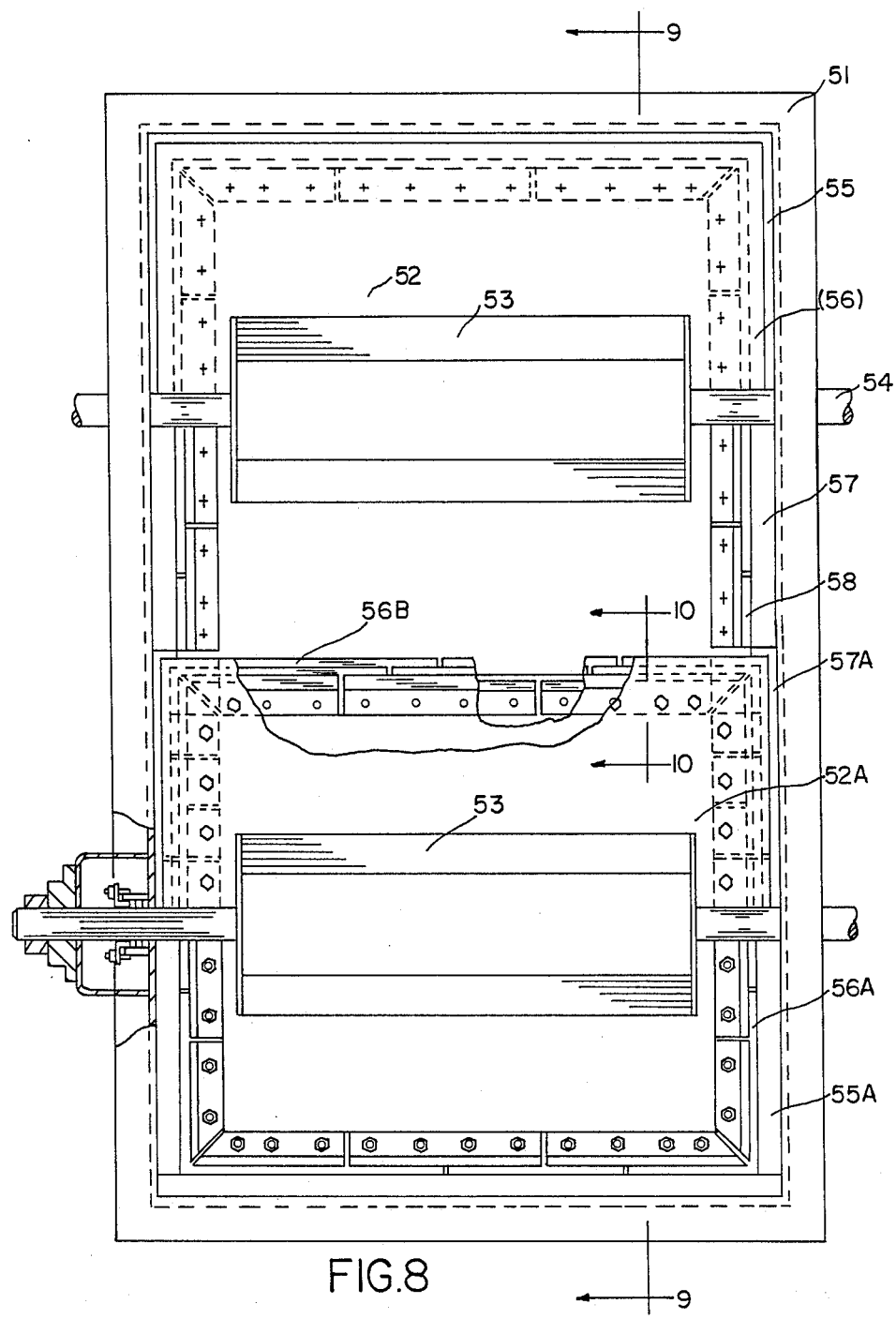
FIG. 8 is a view of a louver damper as seen from its upstream side.
Figure 9:
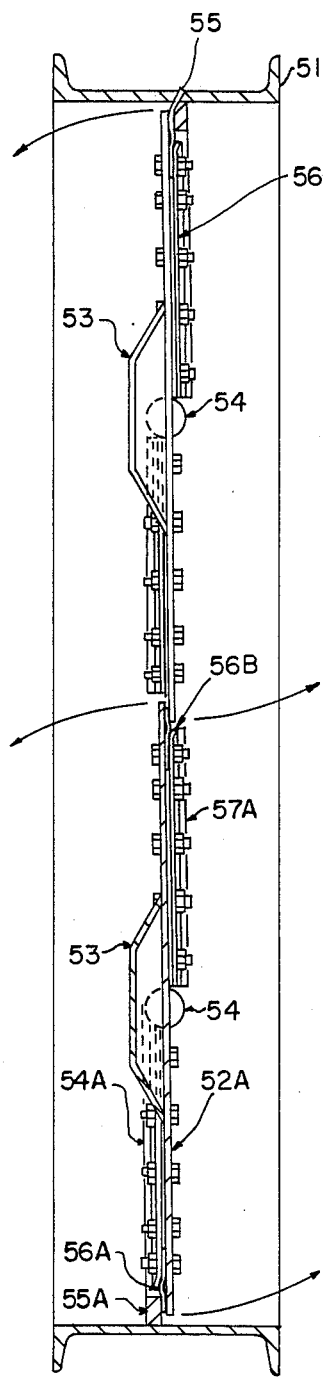
FIG. 9 is a somewhat schematic view illustrating the disposition of the seals and seats of the louver damper of FIG. 8.

Another important use of leaf spring seals in accordance with the invention is in louver dampers Such a damper, see FIGS. 8 and 9, is in control of flow through a port surrounded by a frame 51. A louver damper provided with seals and seats in accordance with the invention is illustrated somewhat schematically by FIGS. 8-12.

The damper is shown as having upper and lower louver blades 52 and 52A, respectively, and each blade has a central reinforcement 53 and axially aligned and centrally located shafts 54. The shafts 54 extend through the frame 51 to be so connected as to be turned together in the directions indicated by arrows in FIG. 9 between parallel positions in which flow through the port is permitted and positions substantially normal to the flow path through the port, the closed positions of the louver blades.

In order that the louver blades 52 and 52A will then block flow through the port, the frame 51 is provided with upper and lower, similarly dimensioned U-shaped seats 55, 55A. The seat 55 extends across the top of the frame 51 and downward along each side thereof to the shafts 54 and is engageable by a similarly disposed U-shaped seal 56. The frame 51 also has side seats 57 for engagement by the side seals 58 mounted on the opposite side of the lower half of the blade 52. As will be apparent from FIG. 9, when the blade 52 turns towards its open position, its upper and lower portions swing away from the seats 55 and 57, respectively.

The seat 55A is for engagement by the U-shaped seal 56A which is or may be identical to the seal 56 and is mounted on the lower half of the blade 52A at the side thereof opposite to the seal 56. The seat 55A extends across the bottom of the frame 51 and upwardly along the sides thereof to the shafts 54 in support of the lower blade 52A. The frame 51 also has side seats 57A which are so located that in the closed positions of the blades, they and the lower margin of the upper blade 52 establish a U-shaped seat for engagement by the U-shaped seal 56B mounted on the blade 52A on the side thereof opposite to the seal 56A.

Figure 10:
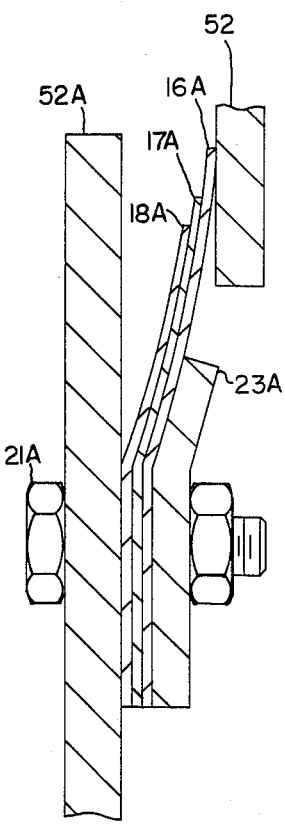
FIG. 10 is a section, on an increase in scale, taken approximately along the indicated line 10—10 of FIG. 8.

While each of the seals may be any of the types illustrated by FIGS. 1-4, they are shown as of the type illustrated by FIG. 3 with the additional feature that the blades 52 and 52A are so dimensioned that their margins completely overlie their seals, see FIG. 10. The seal components are assembled in the previously described manner and are identified by the same reference numerals as have been employed for that purpose in FIG. 3.

While the axes of the shafts 54 are shown as in the same vertical plane, the two blades 52, 52A do not in practice occupy a vertical plane due to the thickness of the seals which causes each blade to be positioned at an extremely small angle relative to such a plane. Seals in accordance with the invention are effective even though their leaf springs are not fully tensioned. While the invention contemplates offsetting the axis of one blade relative to the other lengthwise of the flow path to enable both blades to be vertical, manufacturing and assembly problems make such offsetting of the shafts a less desirable alternative.

Figure 11:
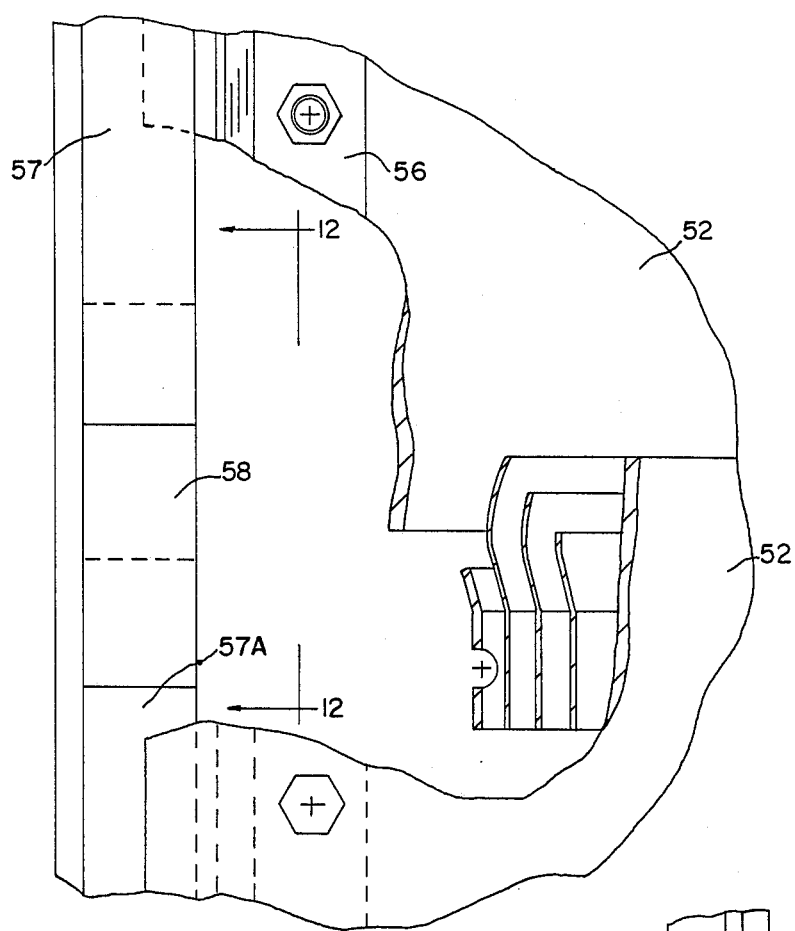
FIG. 11 is a fragmentary and somewhat schematic view of the two seats at one side of the overlap of the louver margin of the upper blade by the upper margin of the lower blade with both blades shown in phantom.
Figure 12:
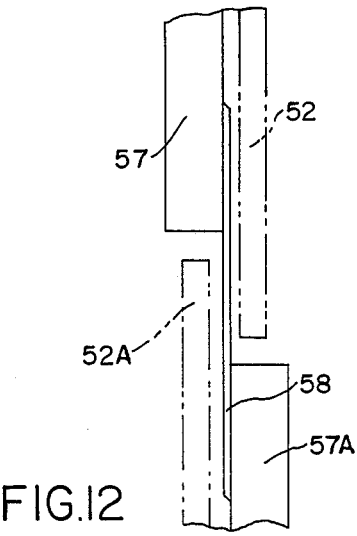
FIG. 12 is a section taken approximately along the indicated line 12—12 of FIG. 11.

Reference is made to FIGS. 11 and 12 which serve to illustrate schematically that the seats 57 and 57A, where the lower margin of the upper blade 52 is overlapped by the upper margin of the lower blade 52A, are so offset, as is required to insure that the blades are free to swing, that leakage paths exist at each end of the blade overlap. To prevent such leakage, a stainless steel strip 58 is anchored at its end to the proximate surface of the adjacent ends of the seats 57 and 57A with the thickness of the sealing strip 58 desirably in the approximate range of 0.050 to 0.093 inches.

From the foregoing construction and use of seals consisting of leaf springs sets in accordance with the invention as well as the features which result in a high degree of seal efficiency will be apparent.

We claim:

1. A damper including a first member having a port, a second member in the form of a blade movable into and out of an operative position relative to the margins of the port, a seat and a seal, one of the members provided with the seat, the seal attached to the other member, said seat and seal disposed and dimensioned for mutual engagement in said operative position and in said operative position sealing the members against leakage between them throughout the length of the seal, said seal comprising a set of leaf springs, and clamping components including a clamping bar and a ledge including an inner clamping portion, each of the leaf springs bent along a lengthwise line to establish inner and outer portions having the same angular relationship, the inner portions between the clamping bar and the inner portion of the ledge, the outer portions progressively narrower, at least the outer portion of maximum width dimensioned and disposed to include a section for engagement with or by the seat, with the leaf spring set then to be tensioned, and clamping connectors extending through and clamping the inner leaf spring portions to said bar and inner ledge portion, the ledge inclined in the same direction as the outer leaf spring portions and disposed and dimensioned to engage an outer leaf spring portion and hold the leaf spring set tensioned at least until said operative position is reached.

2. The damper of claim 1 in which the clamping bar is part of the seal carrying member and the inner portion of the ledge and the inner leaf spring portions have holes through which the connectors freely extend which are dimensioned to enable expansion forces to be accommodated.

3. The damper of claim 1 in which the inner portion of the ledge is part of the seal carrying member and the clamping bar and inner leaf spring portions have holes through which the connectors extend and which are dimensioned to enable expansion forces to be accommodated.

4. The damper of claim 1 in which the connectors also connect the seal to the seal carrying member and the inner leaf spring portions, the clamping bar and the inner portion of the ledge have holes through which the connectors extend and which are dimensioned to enable expansion forces to be accommodated.

5. The damper of claim 1 in which the ledge is inclined relative to its inner portion to a lesser degree than the outer portions of the leaf springs and is disposed and dimensioned to be engaged by the outer leaf spring portion of maximum width inwardly of the seat engaging section thereof then to hold the leaf spring set tensioned until disengaged therefrom when said section engages or is engaged by the seat.

6. The damper of claim 1 in which the ledge is inclined relative to its inner portion to a greater degree than the outer leaf spring portions and is disposed and dimensioned to engage the outer leaf spring portion of minimum width then to hold the leaf spring set tensioned and to provide a shoulder against which the outer portions of the leaf spring set are flexed when the seat and the seal are operatively positioned.

7. The damper of claim 1 in which the seal consists of at least a straight side including a series of lengths of each leaf spring of the set, a series of clamping bar lengths, and a series of ledge lengths, the proximate ends of corresponding lengths of the leaf springs, the clamping bars and the ledges are spaced apart to provide gaps accommodative of thermal expansion forces and are spaced lengthwise of the seal from other gaps in the seal.

8. The damper of claim 1 in which the seal consists of at least a straight side including a series of lengths of each leaf spring of the set and a series of lengths of one of the clamping components the other of which is a part of the seal carrying member, the proximate ends of corresponding lengths of the leaf spring and of said one of the clamping components are spaced apart to provide gaps accommodative of thermal expansion forces and are also spaced lengthwise of the seal and from other gaps in the seal.

9. The damper of claim 1 in which the seal consists of at least a straight side including a series of lengths of each leaf spring of the set and at least one of the clamping components includes a series of lengths, the proximate ends of corresponding lengths of the leaf springs and of said one of the clamping components are spaced apart to provide gaps accommodative of expansion forces, and all of said lengths are equal except at the ends of said side where differently dimensioned lengths are required to enable the offset of the gaps to be established and maintained throughout the full length of the seal.

10. The damper of claim 9 in which the seal consists of three straight sides so disposed and arranged to establish a U-shaped seal in each corner of which the leaf spring of maximum width of one side overlaps the end of the corresponding leaf spring of the adjacent side, at least one other leaf spring of each of the two thus disposed sides abut in the corner with gaps between the corresponding leaf spring ends and at least one connector extends through overlapping leaf spring ends.

11. The damper of claim 9 in which the seal consists of four straight sides so disposed and arranged to establish the seal as rectangular, in each of the four corners of the seal the leaf spring of maximum width of one side overlaps the end of the corresponding leaf spring of the adjacent side, at least one other leaf spring of each of the two thus disposed sides abut in the corner defined thereby with gaps between corresponding leaf spring ends, and a connector extends through overlapping leaf spring ends.

12. The damper of claim 1 in which the leaf springs protrude beyond the margin of the seal carrying member.

13. The damper of claim 1 in which the margin of the seal carrying member overlies the outer portions of the leaf springs.

14. The damper of claim 13 in which the seal carrying member includes the clamping bar as an integral part thereof.

15. The damper of claim 1 in which the first member is the frame of a louver damper and there are upper and lower second members, each in the form of a louver blade having centrally located, axial end shafts extending through opposite sides of the frame and rotatable relative thereto, the axes of the shafts are substantially in a plane substantially normal to the flow path through the port, said shafts divide the blades into upper and lower halves which are substantially in said plane in their operative positions but which move oppositely relative to the flow path as the blades turn from said positions, said seat includes upper and lower U-shaped portions, each of which is secured to corresponding portions of the frame to provide a seat for a half of the appropriate one of the blades, and said seat also including side portions for the lower half of the upper blade and the upper half of the lower blade, said seal includes seal portions, one for each of said seat portions, and one of the margins of the blade halves which are proximate when the blades are in their operative positions constituting a seat portion and a seal portion is carried by the other of said margins for engagement therewith, said seat portions are all so positioned relative to said plane as not to interfere with the turning of the blades.

16. The damper of claim 15 in which the ends of the side seat portions for the lower half of the upper blade and the upper half of the lower blade are on opposite sides of said plane and are spaced vertically from each other, and a length of a flexible metal strip is secured at its ends to the proximate surfaces of the side seat portion.

17. The damper of claim 15 in which one of said proximate blade margins overlies the seat portion established by the other blade margin and the seal is between said portions and secured to one of them.

* * * * *